United States Patent [19]
Paul

[11] 3,762,277
[45] Oct. 2, 1973

[54] POWER ASSIST MECHANISM FOR FLUID CONTROL VALVES

[75] Inventor: John C. Paul, Richmond Heights, Ohio

[73] Assignee: Parker-Hannifin Corporation, Cleveland, Ohio

[22] Filed: Dec. 4, 1972

[21] Appl. No.: 312,140

Related U.S. Application Data

[62] Division of Ser. No. 188,218, Oct. 12, 1971, Pat. No. 3,716,075.

[52] U.S. Cl. .................................................. 91/376
[51] Int. Cl. ............................................... F15b 9/10
[58] Field of Search.................. 91/376; 137/625.63, 137/625.65, 625.66, 625.69

[56] References Cited
UNITED STATES PATENTS

3,511,132   5/1970   Krohn et al...................... 91/376 X

Primary Examiner—Henry T. Klinksiek
Assistant Examiner—Robert J. Miller
Attorney—Walter Maky

[57] ABSTRACT

A power (hydraulic or pneumatic) assist mechanism for a spool valve assembly and the like characterized in that a manually actuated control valve member has a lost motion spring connection with the spool to selectively vent either side of a double acting fluid motor whose piston is connected to the spool so that fluid pressure in the unvented side of the motor is effective to move the piston and spool in the same direction as the movement of the control valve member. The invention is further characterized in the provision of a shuttle valve member which is guided in the cylinder housing of the power assist mechanism in such manner as to define annular orifices of uniform radial width between the ends of said shuttle valve member and a surrounding bore in the cylinder housing, the differential pressure drops across said orifices due to fluid flowing to the vented and unvented sides of said power assist motor being effective to move the shuttle valve member to a position restricting continued flow to the vented side of said motor.

Another characterizing feature of this invention is the provision of a power assist mechanism having a portative electro-magnet means operatively connected to the spool so as to constitute a latch or detent to retain the spool in a selected operating position until released either by operation of the aforesaid manually actuated control valve member or by de-energization of said electromagnet means.

Yet another characterizing feature is the provision of a power assist mechanism having means which imparts an added load on the manually actuated control valve member to provide a sensory indication of an intermediate operating position of the spool from which the actuation of the control valve member and spool may be continued under such added load to another operating position whereat said control valve member and spool are retained by electromagnetic means until released as aforesaid.

Yet another characterizing feature is that in the case of a pneumatic power assist mechanism check valves are provided between the aforesaid shuttle valve and the chambers on opposite sides of the power assist piston, and a stabilizing orifice intercommunicates said chambers to minimize fluttering of the power assist piston and the spool.

12 Claims, 4 Drawing Figures

United States Patent [19]
Paul
[11] 3,762,277
[45] Oct. 2, 1973
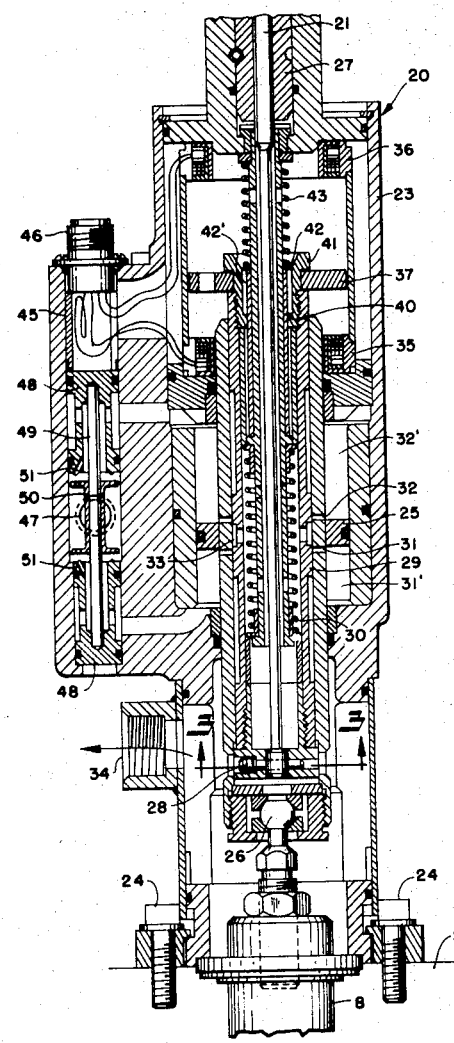

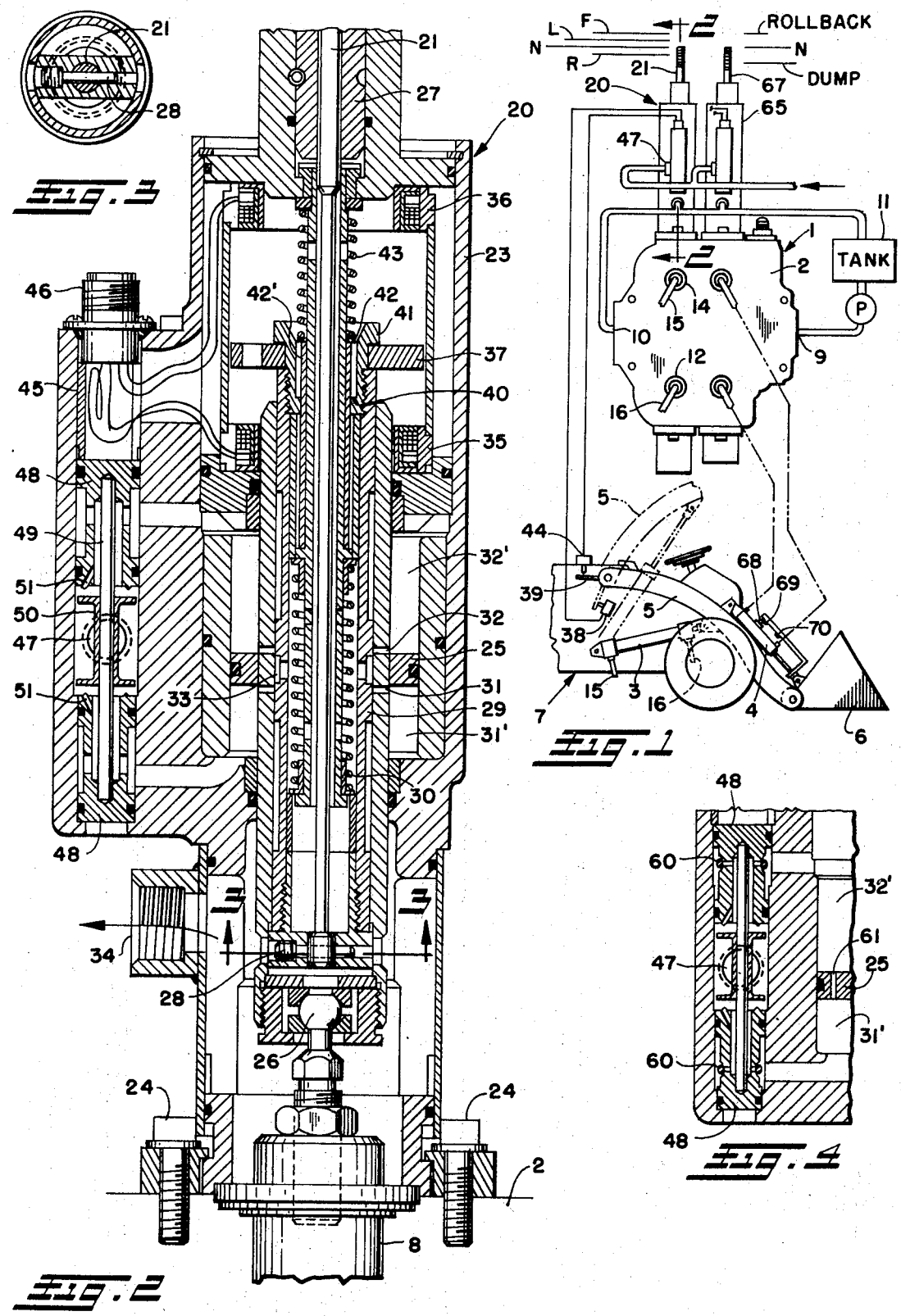

POWER ASSIST MECHANISM FOR FLUID CONTROL VALVES

This is a continuation, division of application Ser. No. 188,218, filed Oct. 12, 1971, now U.S. Pat. No. 3,716,075.

BACKGROUND OF THE INVENTION

It is known, as disclosed in the Robinson U.S. Pat. No. 3,460,438, to provide a power assist mechanism for a spool type valve assembly which comprises a cylinder housing secured to the spool valve housing and a pressure actuated piston in said cylinder housing connected to the valve spool, the manual operating member having a lost motion connection with the piston so as to constitute a control valve member which is movable in opposite directions to selectively vent either side of the piston so that fluid pressure acting on the opposite unvented side thereof will assist the operating member in the movement of the valve spool in the same direction. In the Robinson patent aforesaid, when the power assist mechanism is pneumatically operated, there may be a tendency of piston and spool flutter when the motion of the manual actuator is arrested due to the delay in buildup of air pressure in the previously vented side of the piston and the continued piston and spool moving effect of the air pressure acting on the unvented side of the piston.

Furthermore, in the aforesaid Robinson patent, the centering spring mechanism for the manual actuator is disposed outwardly adjacent the power assist piston-cylinder assembly whereby the provision of electromagnetic latching means is rendered difficult and complex except by adding such mechanism outwardly adjacent the centering spring mechanism thereby substantially lengthening the assembly. Moreover, in Robinson it is necessary to provide two vents, one for the pressure fluid of the power assist mechanism, and the other for the chamber in which the end of the valve spool is connected to the piston of the power assist mechanism.

It is also known to provide a solenoid operated spool valve assembly wherein switches are closed and opened to energize and de-energize the solenoids thereof to effect movement of the spool to one or more operating positions or to release the spool for spring movement from an operating position to neutral inactive position, but these solenoids are what are termed tractive electromagnets which are designed to exert a force on the spool through a substantial distance thus to do work or in effect to provide for power actuation of the spool from neutral position to operating position. However, the closing of a switch contact does not provide any degree of manual control of the spool and hence the spool will be at once moved from neutral position to operating position responsive to closing of the associated switch and therefore the operator of equipment controlled by the spool valve assembly cannot throttle the flow of fluid to the equipment nor can he stop the actuation of the spool at some intermediate position.

SUMMARY OF THE INVENTION

The present invention relates to a power assist mechanism for a spool valve assembly and the like in which the spool movements are at all times under the control of a manual actuating means requiring application of force thereon by the operator and which has associated therewith portative electromagnet means to latch the actuating means and thus the valve spool in one or more of its operating positions, the actuating means being released for spring movement thereof and power assist movement of the spool to neutral inactive position either upon deenergization of the electromagnet means or upon manually overcoming the holding effect of a continuously energized electromagnet means.

The present invention also contemplates the provision of a unitary assembly comprising a power assist mechanism, a portative electromagnet latching means, and a spool springcentering mechanism which is operatively secured to the spool valve housing and to one end of the spool.

Another feature of the present invention is that only a single vent port is required which is disposed between the power assist mechanism and the directional control valve, such single vent accommodating displacement of the spool, the rod portions of the power assist piston, and the electromagnetic latching means.

Another characterizing feature of the present invention is that in a spool having two operating positions on one side of the neutral inactive position is that a position indicator is provided to impose an added load on the movement of the manual actuating member of the power assist mechanism when the first operating position is reached, whereupon the movement of the actuating member may be stopped thereat or continued under increased load to the second operating position whereat the actuating member and valve spool are electromagnetically latched until the electromagnet means is de-energized or overcome by manual effort on the actuating member, at which time the spring centering mechanism of the actuating member will return the latter and the spool to neutral position past the first operating position.

Yet another characterizing feature of the present invention is that the shuttle valve in the inlet port of the power assist mechanism is axially movably guided on a central rod which insures a substantially uniform radial clearance between the ends of the shuttle valve and the surrounding bore of the cylinder housing thus to initiate prompt movement of the shuttle valve to substantially close off the vented side of the piston and to freely conduct pressure fluid to the unvented side of the piston.

Yet another characterizing feature of the present invention is that when air under pressure is used as the power fluid for the power assist mechanism, check valves are provided downstream of the aforesaid shuttle valve, and the pressure in the piston chambers is equalized to eliminate fluttering of the piston and spool when movement of the manual actuating member is arrested.

BRIEF DESCRIPTION OF THE DRAWING

FIG. 1 is an elevation view of a directional control valve having two spools for controlling the actuation of the boom and bucket cylinders of a front end loader, and having the present power assist and electromagnetic latching mechanism;

FIG. 2 is a cross-section view on enlarged scale taken substantially along the line 2—2, FIG. 1 illustrating a preferred form of power assist mechanism and electromagnetic latching means;

FIG. 3 is a cross-section view on enlarged scale taken substantially along the line 3—3, FIG. 2 illustrating the connection between the manual actuating member and the spool and power assist piston assembly; and FIG. 4 is a fragmentary cross-section view of a modification as employed in a pneumatic power assist mechanism.

DETAILED DESCRIPTION OF THE INVENTION

In FIG. 1 the reference numeral 1 denotes a conventional directional control valve having a housing 2 with spools reciprocable therein to control the respective motors 3 and 4 for actuating the boom 5 and bucket 6 respectively of a front end loader 7 or the like. For purposes of illustration, the spool 8 (see FIG. 2) is what is termed in the art a four-way float spool which when the spool 8 is in neutral N position, fluid discharged by the pump P is conducted through the bypass passage in the housing 2 from the inlet port 9 to the tank port 10 from which the fluid is conducted into a tank 11. At that time, the motor ports 12 and 14 are blocked so that the boom 5 will remain in whatever position it is when the spool 8 is moved to neutral N position. When the spool 8 is shifted to raise R position, the aforesaid bypass passage is closed and fluid under pressure is conducted from the inlet port 9 to the motor port 14 and through the conduit 15 to the head end of the motor 3. Fluid displaced from the motor 3 is conducted to the tank port 10 via the conduit 16 and the other motor port 12, whereby the boom 5 may be raised as shown in phantom lines in FIG. 1. When the spool 8 is shifted from neutral N position to the lower L position, fluid under pressure is conducted to the rod end of the motor 3 from the motor port 12 and conduit 16 and the fluid displaced from the head end of the motor 3 is conducted to the tank port 10 via the conduit 15 and motor port 14. When the spool 8 is actuated further from the lower L position to the float F position the motor ports 12 and 14 are placed in fluid communication with each other and with the tank port 10 so that the boom 5 may be lowered by gravity. For examples of spool type directional control valves having four-way float spools therein, reference may be had to the following Pat. Nos.: Stacey, 3,195,559; Stacey, 3,251,277; Schmiel, 3,000,397; Stacey, 3,132,668; Schmiel, 3,160,174; Stacey, 3,262,467; and; Stacey, 3,299,903.

The other spool (not shown) may be of conventional four-way type having an operating position on either side of the neutral mid-position to extend or retract the bucket motor 4 to dump a load from the bucket 6 or to tilt back the bucket 6 to load-holding position and if desired, and as disclosed in certain ones of the above-listed patents, provision may be made for automatic bucket leveling as the boom 5 is raised.

Referring now in detail to FIGS. 1 to 3, the directional control valve 1 has secured to the housing 2 thereof a power assist and an electromagnetic latching mechanism 20 which, as herein described with reference to the boom control spool 8, is operative to assist in the movement of said spool 8 from the N position to the R position or from the N position either to the L or F position by manual actuation of member 21, and to latch the manual actuating member 21 in either the R or F position.

The power the and latching mechanism 20 comprises a cylinder housing 23 which is secured to the directional valve housing 2 as by screws 24 and which has reciprocable therein a piston 25 which at 26 has a self aligning and adjustable connection with the end of the spool 8.

The actuating member 21 is in the form of a rod which is reciprocably guided in a bushing 27 and which has its axially inner end connected as by the pin 28 to a valve member 29, the latter having a limited axial lost motion connection with the piston 25 and spool 8. The valve member 29 is held in the position shown by the centering spring 30 therein and in that position the passages 31 and 32 on opposite sides of the piston 25 are blocked from communication with passage 33 of valve member 29 so that there is no flow of fluid from either chamber 31' or 32' to the exhaust port 34.

The cylinder housing 23 axially adjacent the cylinder chamber 32' has therein a pair of axially spaced apart electromagnets 35 and 36 which, when energized, latch the valve member 29 (and thus the spool 8) in either the R position or the F position by the magnetic attraction of the iron plate 37 secured to the end of the valve member 29.

When the spool 8 and the actuating and valve members 21 and 29 are in the neutral N position, and when the boom 5 is in the full line position, the switch 38 is in closed position whereby as the member 21-29 is shifted to the R position, the energized electromagnet 35 will hold the member 21-29 in that position by the magnetic attraction between the electromagnet coil 35 and the iron plate 37 so that the operator of the equipment may use his hands for performing other operations such as driving the front end loader 7 as the boom 5 is being raised. When the boom 5 has been raised to the phantom line position the arm 39 thereon will engage and open the switch 38 to de-energize the electromagnet 35 thus to release the member 21-29 and the spool 8 for spring return by the spring mechanism 30 to neutral N position. On the other hand, when it is desired to lower the boom 5 with fluid under pressure directed into the rod end of the boom motor 3, the member 21-29 is shifted to the lower L position from neutral N position and when the L position is reached, the shoulder 40 of the plate retainer screw 41 will engage the abutment collar 42 of spring 43 to impose an additional load on the member 21-29 so that the operator can sense or feel when he has reached the proper lower L position. If the operator wishes to actuate the spool 8 to float F position, the member 21-29 movement is continued under the increasing loads of the springs 43 and 30 thereon whereby the member 21-29 and spool 8 will be latched in the float F position because the other switch 44 will at that time be closed to energize the electromagnet 36. The member 21-29 and spool 8 will be released for movement back to neutral N position when the boom 5 reaches its lowered position whereat the arm 39 engages and opens the switch 44.

Normally, the switch 44 is not employed so that the coil 36 is continuously energized and when it is desired to shift the spool 8 from the float F position sufficient manual force is applied on the control member 21 to overcome the electromagnetic holding force between the coil 36 and the plate 37 less the force of the springs 30 and 43.

In the case of a three position four-way spool valve (not shown) the iron plate 37 in the neutral N position will be disposed midway between the electromagnets 35 and 36 so that the member 21-29 and spool 8 will be electromagnetically latched in either of its two operating positions on opposite sides of the neutral N position. In that case, since there is no need for a position indicator the spring 43 and its abutment washer 42 engaged by shoulder 40 may be omitted. A spacer sleeve 42' which positions the abutment washer 42 may also be omitted.

As best shown in FIG. 2 the cylinder housing 23 has a single bore 45 which is parallel to the cylinder bore in which piston 25 reciprocates, said bore 45 containing the electric connector 46 and having passages for the leads of the electromagnetic latches 35 and 36 and also providing a fluid passage for conducting fluid under pressure from the inlet port 47 to chambers 31' or 32' via axially spaced apart bushings 48;48 in said bore 45 having a central rod 49 therebetween on which the shuttle valve 50 is axially guided to maintain uniform annular orifices at its ends.

When the member 21-29 is shifted downwardly with respect to the piston 25, the passage 33 communicates the lower chamber 31' and passage 31 with the return port 34 and the resulting pressure drop in said chamber 31' and below the shuttle valve 50 causes the shuttle valve 50 to move to its lower seat to restrict flow solely through the lower orifice 51 to the return port 34 while fluid under pressure may freely flow around the upper end of the shuttle valve 50 into the upper chamber 32' thus to assist in the movement of the spool 8 toward the raise R position. If, during the movement of the member 21-29, a force insufficient to continually compress the centering spring 30 is exerted thereon, the piston 25 and spool 8 will move down to assume the FIG. 2 position thus to stop the spool 8 movement. However, if continued force is applied on the member 21-29 it will then reach the raise R position at which it will be latched by reason of the closed position of the switch 38. Accordingly, as the boom 5 with a load in the bucket 6 thereof is being raised, the operator's hands are freed to perform other operations, as for instance, driving the front end loader 7 to a dump truck or the like. In any event, when the boom 5 does reach the phantom line raised position, the switch 38 is opened by the arm 39 thus to de-energize the electromagnet 35 to release the member 21-29 and spool 8 for spring power return to neutral N position.

On the other hand, when the member 21-29 is shifted upwardly from the neutral N position, the passage 33 communicates the chamber 32' and passage 32 with the return port 34 whereby the shuttle valve 50 moves to engage the upper seat to restrict flow through the upper orifice 51 into the vented chamber 32' and fluid under pressure in the inlet 47 flows around the annular orifice at the lower end of the shuttle valve 50 and through the housing 23 and bushing 48 passages into the chamber 31', thus to actuate the piston 25 to assist the member 21-29 in actuating the spool 8 upwardly so long as force is maintained on the member 21-29 to increasingly compress the centering spring 30. When the member 21-29 reaches the lower L position the shoulder 40 of the plate retaining screw 41 engages the spring 43 abutment washer 42 whereby the operator will have to apply suddenly increased force on the member 21-29 if he wishes to actuate the spool 8 to the latched float F position. Thus, the spring 43 provides a position indicator which can be sensed or felt by the operator due to the added load on the member 21-29 when the spool 8 has been moved to the lower L position. If the member 21-29 movement upwardly is continued after reaching the L position, the member 21-29 will be latched by electromagnet 36 at the F position. Again, the operator may release the actuating force on the member 21-29 when the spool 8 and member 21-29 are at the F position so that the loader 7 may be driven for re-loading of the bucket 6 as the boom 5 moves down from the phantom line position to the solid line position. When the latter position is reached the arm 39 on the boom 5 will open the switch 44 to de-energize the electromagnet 36 whereby the spring 43 and the centering spring mechanism 30 will shift the member 21-29 and spool 8 all the way back to the neutral N position with power assist.

In the system of FIGS. 1, 2, and 3 the power assist mechanism is hydraulically actuated from a suitable pressure source (not shown), whereas the power assist mechanism shown in FIG. 4 is one which is especially adapted for use wherein the power assist inlet port 47 is connected to a source of air pressure. In that case, the bushings 48 are formed with peripheral grooves in which are received O-ring type check valves 60 which prevent reverse flow of fluid from either cylinder chamber 31' or 32' to the inlet port 47, and in that case the piston 25 may be provided with an equalizing orifice 61 therethrough which intercommunicates the left and right hand chambers 31' and 32' of the power assist cylinder. In actuating a spool 8, it may occur that, when the motion of actuating member 21-29 is arrested, the piston 25 and spool 8 may flutter back and forth except for the provision of the check valves 60 and orifice 61. Herein, when the motion of member 21-29 is arrested or when the plate 37 engages electromagnet 35 or 36 continued motion of the piston 25 and spool 8 will close th vented chamber 31' or 32' so that the pressures in chambers 31' and 32' will be promptly equalized through orifice 61 because the check valves 60 will be closed to prevent further piston 25 movement to vent the previously unvented chamber 31' or 32'. Accordingly, flutter of the piston 25 and spool 8 is prevented.

The bucket tilt cylinder 4 has associated therewith a power assist mechanism 65 to assist movement of the manually operated control valve member 67 to the latched "DUMP" and "ROLLBACK" positions, there being electromagnets 35 and 36 therein equally spaced from the plate 37 when the member 67 and valve spool (not shown) are in neutral "N" position. The bucket 6 is shown in a mid-position in FIG. 1, i.e., a digging or scooping position, and wyen it is desired to hold a load therein the member 67 is shifted from the "N" position to the "ROLLBACK" position at which it will be held by the closing of normally closed switch 68 when the cam 69 is disengaged therefrom. When the cam 70 engages the switch 68 to open it, the member 67 is released for movement to the "N" position. When it is desired to dump the load in bucket 6, the member 67 is moved to the latched "DUMP" position at which it will remain until manual force thereon overcomes the electromagnetic holding force less the spring return force. In the "N" position and in the "DUMP" position the switch 68 is closed whereby movement of member 67 to "ROLLBACK" position will result in latching in that position until cam 69 opens switch 68 to release the member 67 for movement to the "N" position whereby the bucket 6 is automatically positioned in digging position as the boom 5 is lowered by actuation of control member 21 to the "L" position or to the latched "F" position.

Although in the present case the switches 38 and 44 are shown as being actuated by the boom 5, it is to be understood that the switches may be actuated by cams on the piston rod of motor 3, or normally open switches may be closed as by cams on the manually actuated member 21, in which case the appropriate electromagnet 35 or 36 will be energized to latch the control member 21–29 and spool 8 in an operating position until the switch is opened manually or by suitable means. In fact, when the control member 21 and spool 8 are in neutral "N" position cams thereon may be operative to open switches that are in series with switches 38 and 44 on the front end loader 7, whereby there is no current flow through either electromagnet 35 or 36 except when motion of the control member 21 is initiated. At that time, the circuit through the appropriate switch is closed so that the control member 21 and spool 8 will be latched in desired operating position until the switch 38 or 44 is opened as by the boom arm 39, thus to release the control member 21 and spool 8 movement back to neutral N position at which time the other switch circuit will be opened by the switch actuated by the control member 21 when in neutral position. Also, as already mentioned, the electromagnets 35 and 36 may be continuously energized so as to constitute latches or detents which are overcome by manual force on the control members 21 and 67.

I, therefore, particularly point out and distinctly claim as my invention:

1. A power assist mechanism for a spool valve assembly and the like comprising a cylinder housing adapted to be secured to the housing of such assembly and having a pressure inlet port communicating with opposite ends of a cylinder bore in said housing and having an outlet port; a piston reciprocable in said bore and adapted to be connected to the spool of such assembly to reciprocate the latter from neutral position to operating positions on opposite sides of the neutral position responsive to reciprocation of said piston in said bore; a manual actuating member movable in said housing and defining with said piston a control valve to selectively communicate either end of said bore with said outlet port whereby predominant fluid pressure in the other end of said bore is effective to move said piston and thus the spool in the same direction as said actuating member; and electromagnetic latching means in said housing and on said actuating member operative to retain the latter in a position corresponding to one of said operating positions of said spool.

2. The mechanism of claim 1 wherein spring means biases said actuating member to a neutral position corresponding to the neutral position of said spool upon disengagement or de-energization of said latching means.

3. The mechanism of claim 2 wherein said actuating member has an initial axial lost motion connection with said piston to operate said control valve to achieve power assist from said piston during continued movement of said actuating member against the load of said spring means.

4. The mechanism of claim 1 wherein said electromagnetic latching means comprises a portative electromagnet in said housing which when energized magnetically holds a plate on said actuating member in engagement therewith.

5. The mechanism of claim 1 wherein said electromagnetic latching means is disposed coaxially adjacent said cylinder bore; and wherein said actuating member has an magnetizable plate thereon which is retained in engagement with said electromagnet when energized.

6. The power assist mechanism of claim 1 wherein said cylinder housing has a shuttle valve bore and a shuttle valve movable in said bore in opposite directions to restrict flow of pressure fluid from said inlet port to that end of the cylinder bore which is communicated with said outlet port.

7. A power assist mechanism for a spool valve assembly and the like comprising a cylinder housing adapted to be secured to the housing of such spool valve assembly and having a pressure inlet port communicating with opposite ends of a cylinder bore in said housing and having an outlet port; a piston reciprocable in said bore and adapted to be connected to the spool of such spool valve assembly to reciprocate the latter responsive to reciprocation of said piston in said bore; a manual actuating member movable in said housing and defining with said piston a control valve to selectively communicate either end of said bore with said outlet port whereby fluid under pressure in the other end of said bore is effective to move said piston and thus the spool in the same direction as said actuating member; said housing having a shuttle valve bore and a shuttle valve movable in said bore in opposite directions to restrict flow of pressure fluid from said inlet port to that end of the cylinder bore which is then communicated with said outlet port; said shuttle valve having circular end portions which define annular orifices with said shuttle valve bore; said housing having a shuttle valve guide rod coaxial with said shuttle valve bore on which said shuttle valve is guided to define annular orifices of substantially uniform radial width therearound.

8. A power assist mechanism for a spool valve assembly and the like comprising a cylinder housing adapted to be secured to the housing of such spool valve assembly and having a pressure inlet port communicating with opposite ends of a cylinder bore in said housing and having an outlet port; a piston reciprocable in said bore and adapted to be connected to the spool of such spool valve assembly to reciprocate the latter responsive to reciprocation of said piston in said bore; a manual actuating member movable in said housing and defining with said piston a control valve to selectively communicate either end of said bore with said outlet port whereby fluid under pressure in the other end of said bore is effective to move said piston and thus the spool in the same direction as said actuating member; said piston having oppositely extending axially inner and outer tubular rod portions slidably sealed in said cylinder housing adjacent the ends of said cylinder bore, said axially inner rod portion being adapted for connection to such spool; said actuating member extending axially outwardly through said rod portions and through said cylinder housing for manual actuation; said actuating member at its axially inner end portion having an axial lost motion connection with the axially inner rod portion and being thereat connected to a tubular valve member which is slidable in said rod portions to the extent of such axial lost motion to communicate either end of said cylinder bore with said outlet port according to the direction of movement of said actuating member and tubular member from a neutral position whereat neither end of said cylinder bore is communicated with said outlet port; and spring means within said rod portions biasing said tubular member to such neutral position, said spring means being compressed as said movement of said actuating member is continued after takeup of such axial lost motion thus to provide continued power assist movement of the spool by fluid pressure actuation of said piston.

9. A power assist mechanism for a spool valve assembly and the like comprising a cylinder housing adapted to be secured to the housing of such spool valve assembly and having a pressure inlet port communicating with opposite ends of a cylinder bore in said housing and having an outlet port; a piston reciprocable in said bore and adapted to be connected to the spool of such spool valve assembly to reciprocate the latter responsive to reciprocation of said piston in said bore; a manual actuating member movable in said housing and defining with said piston a control valve to selectively communicate either end of said bore with said outlet port whereby fluid under pressure in the other end of said bore is effective to move said piston and thus the spool in the same direction as said actuating member; said housing having a shuttle valve bore and a shuttle valve movable in said bore in opposite directions to restrict flow of pressure fluid from said inlet port to that end of the cylinder bore which is then communicated with said outlet port; and check valves downstream of said shuttle valve to prevent reverse flow of fluid from the ends of said cylinder bore to said inlet port.

10. The mechanism of claim 6 wherein an equalizing orifice intercommunicates opposite ends of said cylinder bore to equalize fluid pressure on opposite sides of said piston when neither side thereof is communicated with said outlet port.

11. A power assist mechanism for a spool valve assembly and the like comprising a cylinder housing adapted to be secured to such spool valve assembly and having a pressure inlet port communicating with opposite ends of a cylinder bore in said housing and having an outlet port; a piston reciprocable in said bore and adapted to be connected to the spool of such spool valve assembly to reciprocate the latter responsive to reciprocation of said piston in said bore; a manual actuating member having a limited lost-motion spring connection with said piston and defining therewith a control valve to selectively communicate either end of said bore with said outlet port whereby fluid under pressure in the other end of said bore is effective to move said piston and thus the spool in the same direction as said actuating member; and electromagnetic latching means in said housing and on said actuating member to retain the latter in spool valve operating position.

12. The mechanism of claim 11 wherein said latching means comprises an electromagnetic coil fixed in said housing, and a magnetizable plate on said actuating member movable into engagement with said coil.

* * * * *